US009855867B2

(12) United States Patent
Satoh et al.

(10) Patent No.: US 9,855,867 B2
(45) Date of Patent: Jan. 2, 2018

(54) VEHICULAR SEAT SLIDE DEVICE

(71) Applicant: AISIN SEIKI KABUSHIKI KAISHA, Kariya-shi (JP)

(72) Inventors: Takanori Satoh, Kasugai (JP); Yasuhiro Kojima, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/021,089

(22) PCT Filed: Oct. 24, 2014

(86) PCT No.: PCT/JP2014/078374
§ 371 (c)(1),
(2) Date: Mar. 10, 2016

(87) PCT Pub. No.: WO2015/060436
PCT Pub. Date: Apr. 30, 2015

(65) Prior Publication Data
US 2016/0221477 A1  Aug. 4, 2016

(30) Foreign Application Priority Data

Oct. 25, 2013 (JP) .................................. 2013-222351
Oct. 25, 2013 (JP) .................................. 2013-222352

(51) Int. Cl.
*B60N 2/08* (2006.01)
*B60N 2/07* (2006.01)

(52) U.S. Cl.
CPC ......... *B60N 2/0837* (2013.01); *B60N 2/0705* (2013.01); *B60N 2/0715* (2013.01); *B60N 2/085* (2013.01); *B60N 2/0818* (2013.01)

(58) Field of Classification Search
CPC .......... B60N 2/08; B60N 2/12; B60N 2/0818; B60N 2/085; B60N 2/07; B60N 2/0722;
(Continued)

(56) References Cited

U.S. PATENT DOCUMENTS 8,398,043 B2 * 3/2013 Kimura ................ B60N 2/0705
248/424
8,757,577 B2 * 6/2014 Naoki .................. B60N 2/0705
248/423
(Continued)

FOREIGN PATENT DOCUMENTS

CN         103260942 A     8/2013
EP         2 653 341 A1   10/2013
(Continued)

OTHER PUBLICATIONS

Extended European Search Report dated Oct. 18, 2016 in Patent Application No. 14855712.7.
(Continued)

*Primary Examiner* — Nkeisha Smith
(74) *Attorney, Agent, or Firm* — Oblon, McClelland, Maier & Neustadt, L.L.P.

(57) ABSTRACT

A vehicular seat slide device includes a lower rail, an upper rail supporting a seat above, a lock lever supported by the upper rail and configured to restrict the relative movement of the upper rail by engaging with the lower rail, a spring attached to the upper rail and biasing in such a manner that the lock lever engages with the lower rail. The spring includes a locking portion inserted in a locking hole provided at an upper edge of the upper rail and opening to a side surface of the upper rail, the locking portion is insertable into the locking hole by elastically deforming the spring body towards an inner side relative to the locking hole, the locking portion is restricted from being detached from the locking hole by being locked at a peripheral edge of the locking hole due to recovery of the elastic deformation.

7 Claims, 6 Drawing Sheets

(58) Field of Classification Search
CPC .. B60N 2/0715; B60N 2/0705; B60N 2/0825; B60N 2/06; B60N 2/0837
USPC .............. 248/424, 425, 429, 430; 297/65.13, 297/65.15, 344.11
See application file for complete search history.

(56) References Cited

U.S. PATENT DOCUMENTS

| | | | |
|---|---|---|---|
| 8,936,227 B2* | 1/2015 | Kawamura | B60N 2/08 248/429 |
| 9,016,655 B2* | 4/2015 | Aoi | B60N 2/0705 248/430 |
| 9,045,060 B2* | 6/2015 | Zaiki | B60N 2/0705 |
| 9,056,561 B2* | 6/2015 | Hayashi | B60N 2/0705 |
| 9,145,070 B2* | 9/2015 | Hayashi | B60N 2/0705 |
| 9,150,125 B2* | 10/2015 | Hayashi | B60N 2/0705 |
| 9,238,422 B2* | 1/2016 | Yamada | B60N 2/07 |
| 9,283,870 B2* | 3/2016 | Yamada | B60N 2/0705 |
| 9,315,119 B2* | 4/2016 | Yamada | B60N 2/07 |
| 9,327,616 B2* | 5/2016 | Hoshihara | B60N 2/0856 |
| 9,469,217 B2* | 10/2016 | Hayashi | B60N 2/0705 |
| 2011/0163217 A1* | 7/2011 | Kimura | B60N 2/0705 248/429 |
| 2013/0056604 A1* | 3/2013 | Hayashi | B60N 2/0705 248/429 |
| 2013/0119221 A1 | 5/2013 | Hayashi | |
| 2013/0119222 A1* | 5/2013 | Hayashi | B60N 2/0705 248/429 |
| 2014/0042289 A1* | 2/2014 | Kawano | B60N 2/0818 248/429 |
| 2014/0110552 A1* | 4/2014 | Yamada | B60N 2/0705 248/429 |
| 2014/0145054 A1* | 5/2014 | Yamada | B60N 2/0705 248/429 |
| 2014/0239690 A1* | 8/2014 | Yamada | B60N 2/07 297/344.1 |
| 2015/0291062 A1* | 10/2015 | Yamada | B60N 2/0705 384/47 |
| 2015/0306981 A1* | 10/2015 | Arakawa | B60N 2/0705 248/429 |
| 2016/0221476 A1* | 8/2016 | Satoh | B60N 2/0705 |
| 2016/0221477 A1* | 8/2016 | Satoh | B60N 2/0837 |

FOREIGN PATENT DOCUMENTS

| | | |
|---|---|---|
| JP | 11-59239 A | 3/1999 |
| JP | 2002-200934 A | 7/2002 |
| JP | 2010-100077 A | 5/2010 |
| JP | 2013-52843 A | 3/2013 |
| WO | WO 2013/035536 A1 | 3/2013 |

OTHER PUBLICATIONS

International Search Report dated Jan. 20, 2015 in PCT/JP2014/078374 filed Oct. 24, 2014.
International Preliminary Report on Patentability and Written Opinion of the International Searching Authority dated Apr. 26, 2016 in PCT/JP2014/078374 filed Oct. 24, 2014 (submitting English translation only).
Combined Office Action and Search Report dated Mar. 3, 2017 in Chinese Patent Application No. 201480057691.7 with English translation.

* cited by examiner

VEHICULAR SEAT SLIDE DEVICE

TECHNICAL FIELD

The invention relates to a vehicular seat slide device.

BACKGROUND ART

Conventional vehicular seat slide devices provided with a lock lever restricting an upper rail from moving relative to a lower rail includes a vehicular seat slide device described in Patent document 1, for example. At the vehicular seat slide device described in Patent document 1, a spring biasing the lock lever in a lock direction is attached to the upper rail.

At a vehicular seat slide device described in Patent document 2, a spring biasing a lock plate corresponding to the lock lever in a lock direction is attached to an upper rail.

DOCUMENT OF PRIOR ART

Patent Document

Patent document 1: Japanese Patent Application Publication 2013-52843
Patent document 2: Japanese Patent Application Publication 2010-100077

OVERVIEW OF INVENTION

Problem to be Solved by Invention

At the vehicular seat slide device of Patent document 1, when the spring is attached to the upper rail, a process of positioning the spring relative to the upper rail and a process of fastening the spring to the upper rail are needed. Further, at the respective processes, a configuration for positioning the spring and a configuration for fastening the spring to the upper rail are also needed.

At the vehicular seat slide device of Patent document 2, a rear end portion of the spring is arranged at a lower side relative to a lock plate rear side base portion of the lock plate. The rear end portion of the spring biases the lock plate rear side base portion from the lower side towards an upper side, that is, towards the lock direction. However, in a case where positioning of the rear end portion of the spring is not performed properly and thus the rear end portion of the spring is dislocated from the lock plate rear side base portion, the biasing of the lock plate rear side base portion towards the lock direction may not be performed sufficiently. Accordingly, there is a possibility that an unintended movement of the upper rail is allowed. Therefore, it is desired that variation in the positioning of the spring relative to the lock plate is reduced.

That is, at the vehicular seat slide devices of Patent documents 1 and 2, improvement in an assembling performance when attaching the spring to the upper rail is desired. A purpose of the invention is to provide a vehicular seat slide device which can enhance an assembling performance when attaching a spring to an upper rail.

Means for Solving Problem

A vehicular seat slide device of a first aspect which achieves the above-described purpose includes a lower rail, an upper rail provided to be movable relative to the lower rail along a long-side direction of the lower rail and configured to support a seat above, a lock lever supported by the upper rail and configured to restrict the relative movement of the upper rail by engaging with the lower rail, and a spring attached to the upper rail, and biasing in such a manner that the lock lever engages with the lower rail, the spring includes a spring body, and a locking portion inserted in a locking hole provided at an upper edge of the upper rail and opening to a side surface of the upper rail, the locking portion being insertable into the locking hole by elastically deforming the spring body towards an inner side relative to the locking hole, the locking portion restricted from being detached from the locking hole in an insertion direction by being locked at a peripheral edge of the locking hole due to recovery of the elastic deformation.

According to the above-described configuration, when the spring is attached to the upper rail, the spring, that is, the locking portion can be placed at the upper edge of the upper rail in such a manner that the upper edge is aimed at when the locking portion is placed and can be inserted into the locking hole. In addition, when attaching the spring to the upper rail, the locking portion is inserted into the locking hole in a state where the spring body is elastically deformed, and thus the locking portion is locked at the peripheral edge of the locking hole. With the use of the above-described locking manner, when the spring is attached to the upper rail, the positioning of the locking portion relative to the locking hole is conducted easily. In addition, the positioning of the spring relative to the upper rail and the fastening of the spring to the upper rail are performed together with each other. Thus, an assembly process of attaching the spring to the upper rail and a configuration for the assembly can be simplified. That is, in a case where the spring is being attached to the upper rail, an assembling performance of the spring can be enhanced.

It is ideal that the vehicular seat slide device stated above further includes an operation handle operated to release the engagement of the lock lever and the lower rail with each other, wherein the spring includes a first biasing portion biasing the lock lever in such a manner that the engagement of the lock lever and the lower rail with each other is maintained, the spring includes a second biasing portion biasing the operation handle in such a manner that the engagement of the lock lever and the lower rail with each other is maintained, and the first biasing portion and the second biasing portion are connected to each other via the locking portion including a continuously bent configuration.

In a case where actions that are different from each other are provided at the first biasing portion and at the second biasing portion, a stress related thereto may concentrate at a joining portion. In this regard, in the above-described configuration, the locking portion includes the continuously bent configuration and therefore the stress does not concentrate on a limited portion of the locking portion serving as the joining portion at which the first biasing portion and the second biasing portion are joined to each other. Accordingly, an even distribution of the stress is achieved. Accordingly, the configuration for attaching the spring to the upper rail is simplified, and also it can be restricted that the engagement of the lock lever and the lower rail with each other is not maintained.

At the vehicular seat slide device stated above, it is ideal that the spring includes a bent portion provided at a position corresponding to the peripheral edge of the locking hole, the bent portion being bent towards the insertion direction to the locking hole.

According to the above-described configuration, the spring is prevented by the bent portion from being in contact with the peripheral edge of the locking hole specifically at a front side in the insertion direction to the upper rail. Accordingly, in a state where the spring is attached to the upper rail, the positioning of the spring relative to other component member, including, the lock lever, is more reliable.

It is ideal that the locking portion includes an arc configuration. According to this, the attachment portion does not include a linear portion, and thus the even distribution of the stress is achieved appropriately.

A vehicular seat slide device of a second aspect which achieves the above-described purpose includes a lower rail, an upper rail provided to be movable relative to the lower rail along a long-side direction of the lower rail and configured to support a seat above, a lock lever supported by the upper rail and configured to restrict the relative movement of the upper rail by engaging with the lower rail, and a spring attached to the upper rail and biasing in such a manner that the lock lever engages with the lower rail, the spring including an attachment portion attached to the upper rail, a biasing portion arranged at a predetermined position of the lock lever and biasing in such a manner that the lock lever engages with the lower rail, and a contact portion being between the attachment portion and the biasing portion, and being in contact with an inner surface of the upper rail.

According to the above-described configuration, when the spring is attached to the upper rail, the biasing portion of the spring comes into contact with the inner surface of the upper rail, and thus the positioning of the biasing portion relative to the lock lever is performed. That is, as long as the contact portion comes in contact with the inner surface of the upper rail, a state of the positioning can be reproduced at the portion from the contact portion to the biasing portion. The positioning includes, for example, a dimension of the portion from the contact portion to the biasing portion and an arrangement of the biasing portion. Consequently, the positioning of the biasing portion relative to the lock lever is easily reproduced on the basis of a setting assuming the state in which the spring has been attached to the upper rail. That is, because the positioning of the spring is easily conducted, the assembling performance of attaching the spring to the upper rail can be enhanced. As a result, the positioning of the spring relative to the lock lever is restricted from varying.

At the vehicular seat slide device described above, it is ideal that the spring includes a continuous portion being out of contact with the inner surface with which the contact portion is in contact, the continuous portion being provided continuously from the attachment portion to the contact portion.

According to the above-described configuration, the continuous portion from the attachment portion to the biasing portion is not in contact with the inner surface with which the contact portion is in contact, which makes the contact of the contacting portion to the inner surface of the upper rail to be more reliable. Thus, even in a case where an attachment error occurs between the attachment portion and the contact portion in association with the attachment of the spring to the upper rail, a posture of the spring in a state of being attached to the upper rail is adjusted autonomously by itself between the attachment portion and the contact portion. As a result, the positioning of the spring relative to the lock lever is restricted from varying.

At the vehicular seat slide device described above, it is ideal that the spring includes two leg portions formed by wire material bent in two and the spring is attached to the upper rail in such a manner that a width direction of each of the leg portions matches a width direction of the upper rail. The contact portions face in the width direction of each of the leg portions, and the contact portions are provided to project in the width direction and are in contact with both side walls of the upper rail. A width of the contact portions facing in the width direction of each of the leg portions, before being attached to the upper rail, is set to be larger than an opening width of the upper rail.

According to the above-described configuration, the contact portions of the spring are attached to the upper rail by being deformed in a direction in which the contact portions come closer to each other. In addition, the contact portions of the spring are in contact with inner surfaces of both side walls of the upper rail and the contacted state is maintained, due to a recovery force for recovering from the elastic deformation. Thus, the contact of the contact portions to the inner surface of the upper rail, that is, the contact of the contact portions to both side walls, is made more reliable.

In the second aspect, it is ideal that the spring includes a spring body, and the attachment portion is inserted in a locking hole provided at an upper edge of the upper rail and opening to a side surface of the upper rail, the attachment portion is insertable into the locking hole by elastically deforming the spring body towards an inner side relative to the locking hole, the attachment portion is locked at a peripheral edge of the locking hole due to recovery of the elastic deformation so that the attachment portion is restricted from being detached from the locking hole.

According to the above-described configuration, when the spring is attached to the upper rail, the spring, that is, the attachment portion, can be applied to the upper edge of the upper rail in such a manner that the upper edge is aimed at, and can be inserted into the locking hole. In addition, when attaching the spring to the upper rail, the attachment portion is inserted into the locking hole in a state where the spring body is elastically deformed, and thus the attachment portion can be locked at the peripheral edge of the locking hole. With the use of the above-described locking manner, when the spring is attached to the upper rail, the positioning of the attachment portion relative to the locking hole is conducted easily. In addition, the positioning of the spring relative to the upper rail and the fastening of the spring to the upper rail are performed together with each other. Thus, the assembly process of assembling the spring to the upper rail and the configuration for the assembling process can be simplified.

In the second aspect, the vehicular seat slide device includes an operation handle operated to release the engagement of the lock lever and the lower rail with each other, wherein the spring includes a first biasing portion biasing the lock lever in such a manner that the engagement of the lock lever and the lower rail with each other is maintained, the spring includes a second biasing portion biasing the operation handle in such a manner that the engagement of the lock lever and the lower rail with each other is maintained, and the first biasing portion and the second biasing portion are joined to each other by the attachment portion including a continuously bent configuration.

According to the above-described configuration, in a case where actions that are different from each other are provided at the first biasing portion and at the second biasing portion, respectively, a stress related thereto may concentrate at a joining portion. In this regard, in the above-described configuration, the attachment portion includes the continuously bent configuration and therefore the stress does not concentrate on a limited portion of the attachment portion serving as the joining portion of the first biasing portion and the second biasing portion. Accordingly, an even distribution of the stress is achieved. Accordingly, the configuration for attaching the spring to the upper rail is simplified, and also it can be restricted that the engagement of the lock lever and the lower rail with each other is not maintained.

In the second aspect, it is ideal that the attachment portion includes an arc configuration. According to this, the attachment portion does not include a linear portion, and thus the even distribution of the stress is achieved appropriately.

In each of the above-described aspects, it is ideal that a direction in which the first biasing portion biases the lock lever and a direction in which the second biasing portion biases the operation handle are opposite to each other. According to this, the even distribution of the stress is appropriately achieved even in a case where the spring functioning as a so-called torsion spring, at which the biasing directions at the first biasing portion and the second biasing portion are opposite to each other, is used.

Effect of Invention

According to the invention, an assembling performance when assembling a spring to an upper rail can be enhanced.

MODE FOR CARRYING OUT THE INVENTION

First Embodiment

Figure 1:
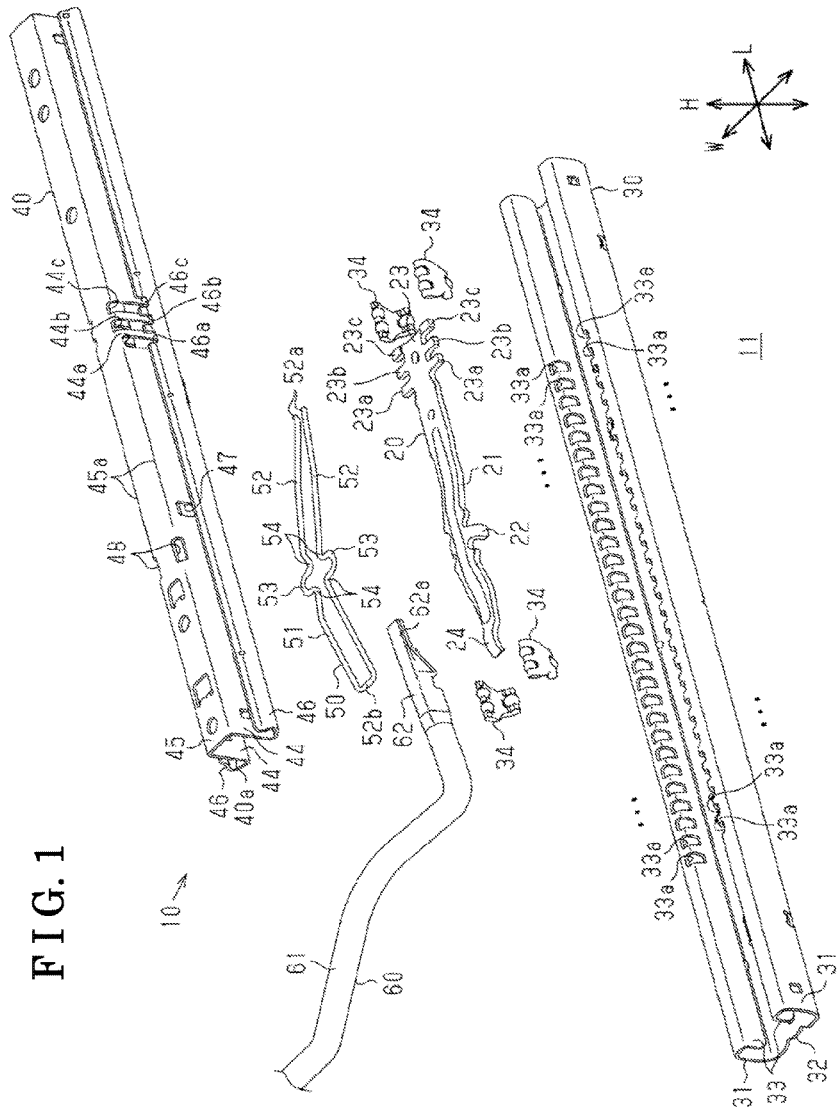
FIG. 1 is a perspective view of a vehicular seat slide device.
Figure 2:
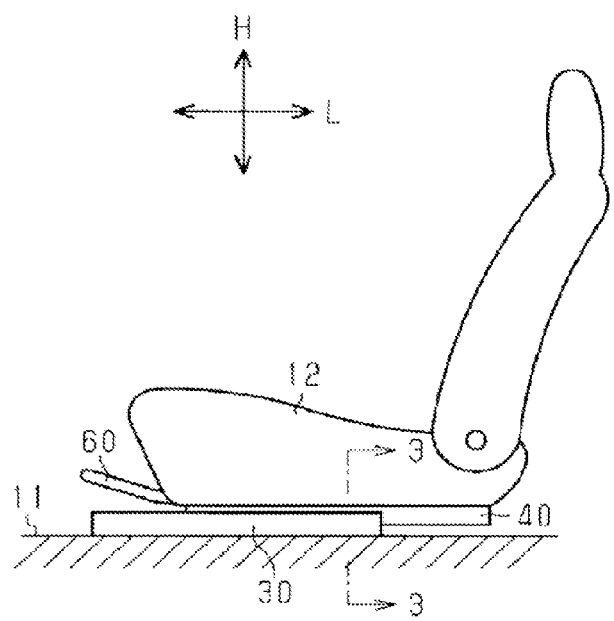
FIG. 2 is a side view illustrating a schematic configuration of a seat for a vehicle and the vehicular seat slide device.

A first embodiment of a vehicular seat slide device will be described hereunder with reference to FIGS. 1 to 6. As illustrated in FIGS. 1 and 2, a pair of lower rails 30 is fixed to a vehicle floor 11 to extend in a front and rear direction L of a vehicle. The lower rails 30 are arranged on the left side and the right side, respectively, as a pair. The upper rails 40 are attached to the lower rails 30, respectively, to relatively move on the lower rails 30 in a long-side direction of the lower rails 30. The upper rails 40 are arranged on the left side and the right side, respectively, as a pair. A seat 12 for the vehicle is supported above the upper rails 40. In this embodiment, a vehicular seat slide device 10 is formed by the lower rails 30 and the upper rails 40.

The upper rail 40 is provided with an operation handle 60 operated for performing a position adjustment of the seat 12 in the front and rear direction L with the use of a function of the seat slide device 10. The operation handle 60 is extended to a front side relative to the seat 12. At the seat slide device 10, as the operation handle 60 is pulled up, the upper rails 40 become movable together with the seat 12 relative to the lower rails 30.

Figure 3:
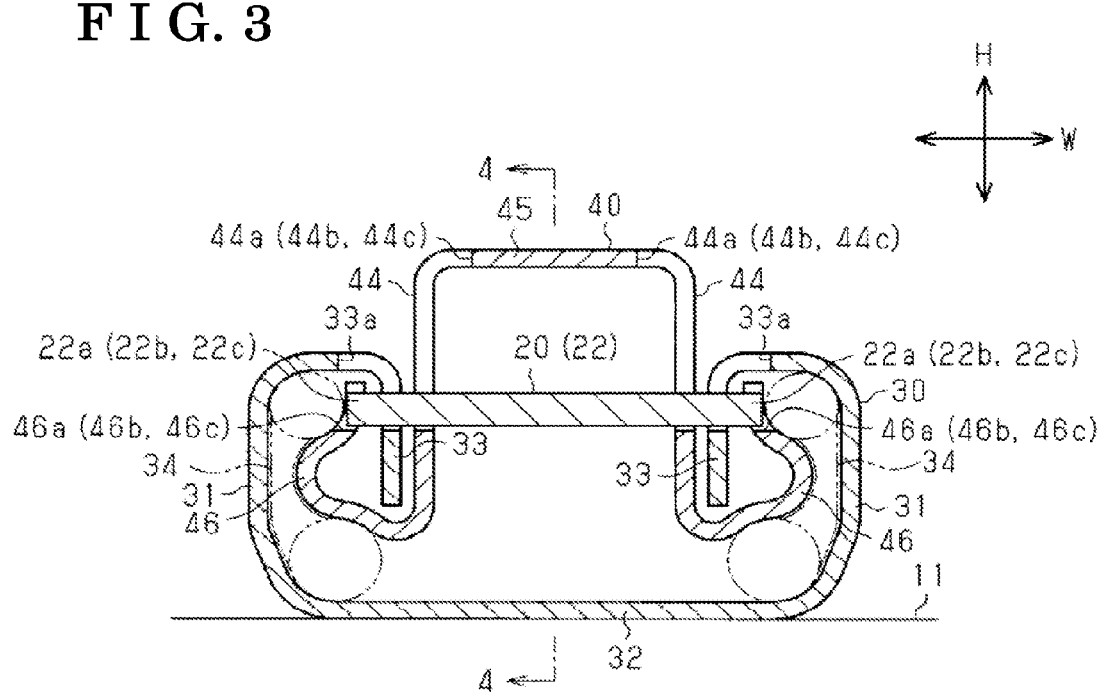
FIG. 3 is a cross-sectional view taken along line 3-3 of FIG. 2.

A configuration of the vehicular seat slide device 10 will be described hereunder. As illustrated in FIGS. 1 and 3, the lower rail 30 is provided with a bottom wall portion 32 including a plate shape and fixed to the vehicle floor 11. An outer wall portion 31 is provided to stand at each of both ends of the bottom wall portion 32 in a width direction W. A folded-in portion 33 is provided in an extended manner at an upper end of each outer wall portion 31. Each folded-in portion 33 is folded towards an inner side of the width direction W.

The folded-in portions 33 are provided with plural lock holes 33a formed at upper edges that face each other, in a manner that the plural lock holes 33a are arranged to be equally spaced from one another in the front and rear direction L. The two lock holes 33a that face each other form a pair. Each lock hole 33a opens upwardly and includes a substantially trapezoidal shape tapered from an upper side towards a lower side when viewed from the facing lock hole 33a.

As illustrated in FIGS. 1 and 3, the upper rail 40 is disposed between the folded-in portions 33 of the lower rail 30 and includes a pair of side wall portions 44, and the side wall portions 44 face each other in the width direction W. The side wall portions 44 are connected to each other by an upper wall portion 45 including a plate shape.

A folded-out portion 46 is provided in an extended manner at a lower end of each side wall portion 44. Each folded-out portion 46 is folded out to an outer side of the width direction W. The folded-out portions 46 are arranged inside space portions surrounded by the outer wall portions 31 of the lower rail 30 and the folded-in portions 33 of the lower rail 30, respectively, and therefore relative movements of the upper rail 40 relative to the lower rail 30 in an upper and lower direction H and in the width direction W are restricted.

A pair of retainers 34 is disposed between the outer wall portion 31 of the lower rail 30 and the folded-out portion 46 of the upper rail 40. The retainers 34 are provided as a pair arranged at a front side and a rear side, and each retainer 34 is provided with plural rolling elements each formed in a ball shape. Each retainer 34 includes the plural rolling elements of which sizes are different from each other. As the retainers 34 roll while being in slidably contact with the outer wall portion 31 of the lower rail 30 and the folded-out portion 46 of the upper rail 40, the smooth relative movement of the upper rail 40 relative to the lower rail 30 can be ensured.

Plural insertion holes 44a, 44b, 44c (at three positions in this embodiment) are formed at each side wall portion 44 of the upper rail 40 to be equally spaced from one another in the front and rear direction L. The insertion holes 44a, 44b, 44c formed at one of the side wall portions 44 and the insertion holes 44a, 44b, 44c formed at the other of the side wall portions 44 form pairs, respectively. The space between the insertion holes 44a to 44c is set to be identical to the space between the lock holes 33a. In addition, each of the insertion holes 44a to 44c is extended in an upper and lower direction from a lower edge at which the side wall portions 44 face each other to the upper wall portion 45. Each of the insertion holes 44a to 44c includes a circular arc configuration curved backward as viewed from the facing insertion holes 44a to 44c, respectively.

An insertion hole 47 is formed at each side wall portion 44 of the upper rail 40 to be arranged at a front side relative to the insertion holes 44a to 44c. The insertion hole 47 of one of the side wall portions 44 and the insertion hole 47 of the other of the side wall portions 44 form a pair. Each insertion hole 47 includes a substantially trapezoidal shape tapered from the upper side towards the lower side as viewed from the facing insertion hall 47.

A locking hole 48 is formed at each of upper edges 45a serving as joints between the side wall portions 44 and the upper wall portion 45 of the upper rail 40. The locking holes 48 are arranged at a front side relative to the insertion holes 44a to 44c and 47. The locking hole 48 of one of the upper edges 45a and the locking hole 48 of the other of the upper edges 45a form a pair facing each other in the width direction W. Each locking hole 48 includes a substantially rectangular shape and opens to an outer side including a side surface of the upper rail 40 (each locking hole 48 opens to an upper surface and to the side surface in this embodiment). Each locking hole 48 is extended along the upper edge 45a of the upper rail 40.

Engaging grooves 46a, 46b, 46c are formed at each folded-out portion 46 of the upper rail 40 to be equally spaced from one another in the front and rear direction L. The number of the engaging grooves 46a to 46c is identical to the number of the insertion holes 44a to 44c. The engaging grooves 46a, 46b, 46c formed at one of the folded-out portion 46 and the engaging grooves 46a, 46b, 46c formed at the other of the folded-out portion 46 form pairs, respectively. The space between the engaging grooves 46a to 46c is set to be identical to the space between the insertion holes 44a to 44c, that is, the space between the lock holes 33a. The engaging grooves 46a to 46c face the insertion holes 44a to 44c, respectively. In addition, the engaging grooves 46a to 46c extend from an upper end of the folded-out portion 46 towards a lower side. Each of the engaging grooves 46a to 46c includes a circular arc configuration curved backward as viewed from the facing engaging grooves 46a to 46c, respectively.

As illustrated in FIGS. 1 and 3, a lock lever 20 is arranged inside a space portion (which will be hereinafter referred to as "inside an upper rail body") surrounded by the side wall portions 44 of the upper rail 40 and the upper wall portion 45 of the upper rail 40 so as to follow a long-side direction of the upper rails 40.

The lock lever 20 includes a body portion 21 formed in an elongated plate shape extended in the front and rear direction L. A pair of pivot shaft portions 22 is protrudingly provided at the body portion 21 at positions at which the pivot shaft portions 22 are coaxial with each other. Each pivot shaft portion 22 protrudes towards the outer side in the width direction W and is folded and bent downwardly. As each pivot shaft portion 22 is inserted in the corresponding insertion hole 47 of the upper rail 40, the lock lever 20 is pivotally supported by the upper rail 40.

Each pivot shaft portion 22 is set to include a length in such a manner that an end of the pivot shaft portion 22 is engageable with the corresponding insertion hole 47 of the upper rail 40. More specifically, the length of each pivot shaft portion 22 is set in such a manner that, in a state where the body portion 21 is brought into contact with an upper edge of one of the insertion holes 47, the pivot shaft portion 22 which is away from the upper edge can pass through from a lower edge of the other of the insertion holes 47.

A rear end portion 23 is provided at one end of the body portion 21, and the rear end portion 23 is arranged at a rear side relative to the pivot shaft portions 22 in a state of being supported by the upper rail 40. At the rear end portion 23 of the body portion 21, a pair of locking claws 23a, 23b, 23c is provided at plural positions (a pair is provided at three positions in this embodiment) to be equally spaced from each other in the front and rear direction L. The space between the locking claws 23a to 23c is set to be identical to the space between the insertion holes 44a to 44c, that is, the space between the lock holes 33a. The locking claws 23a to 23c protrude from both sides of the body portion 21 to the outer side in the width direction W.

Each of the locking claws 23a to 23c is set to include an end which is larger than a width of the upper rail 40 and to include a length which allows each of the locking claws 23a to 23c to engage with the corresponding engaging grooves 46a to 46c. More specifically, the length of each locking claws 23a is set such that, in a state where a root of one of the locking claws 23a is in contact with an upper edge of the insertion hole 44a serving as the inserting destination, an end of the other of the locking claws 23a can pass through from a lower edge of the insertion hole 44a serving as the inserting destination. Each of the locking claws 23b, 23c is set to include a similar length to the locking claw 23a.

When each of the locking claws 23a to 23c is inserted in the corresponding insertion hole 44a to 44c, the locking claws 23a to 23c are allowed to move up and down along the insertion holes 44a to 44c according to the pivoting movement of the lock lever 20. As the lock lever 20 pivots, the locking claws 23a to 23c move up and down, and engage with and disengage from the corresponding lock holes 33a at positions depending on a relative position of the upper rail 40 relative to the lower rail 30.

Figure 4:
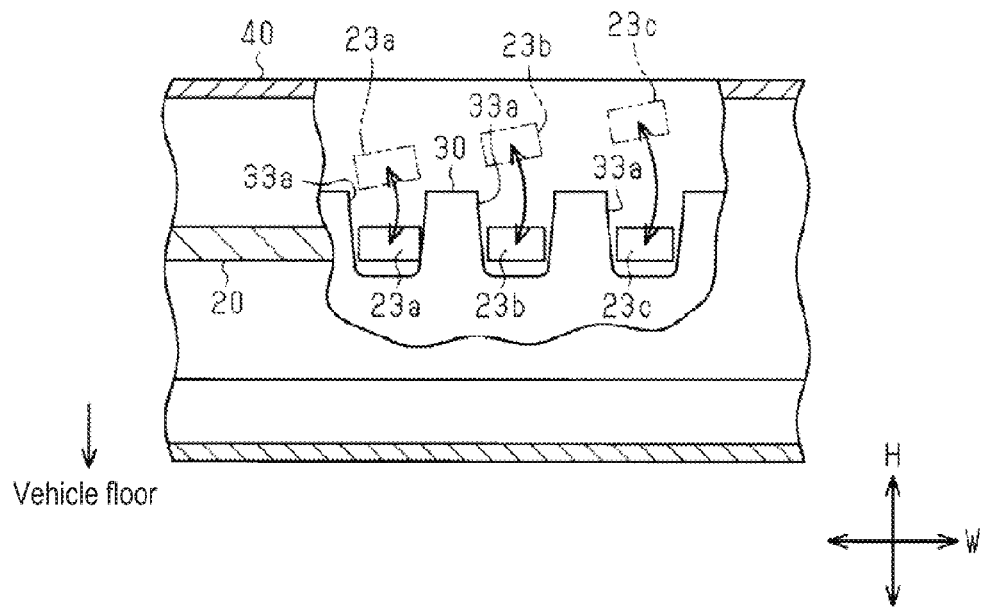
FIG. 4 is a cross-sectional view illustrating a cross-sectional configuration taken along line 4-4 of FIG. 3 and schematically illustrating a locking claw.

More specifically, as illustrated in FIG. 4, as the lock lever 20 pivots, the locking claws 23a to 23c move downwardly and come to engage with the corresponding lock holes 33a of the lower rail 30. That is, the locking claws 23a to 23c move to the positions indicated with the full lines in FIG. 4. Thus, the seat slide device 10 comes to be in a locked state which restricts the relative movement of the upper rail 40. As the lock lever 20 pivots due to the operation of the operation handle 60, the locking claws 23a to 23c move upwardly and come to disengage from the corresponding lock holes 33a of the lower rail 30. The locking claws 23a to 23c move to the positions indicated with the alternate long and two short dashes lines in FIG. 4. Thus, the seat slide device 10 comes to be in an unlocked state which allows the relative movement of the upper rail 40.

Figure 5A:
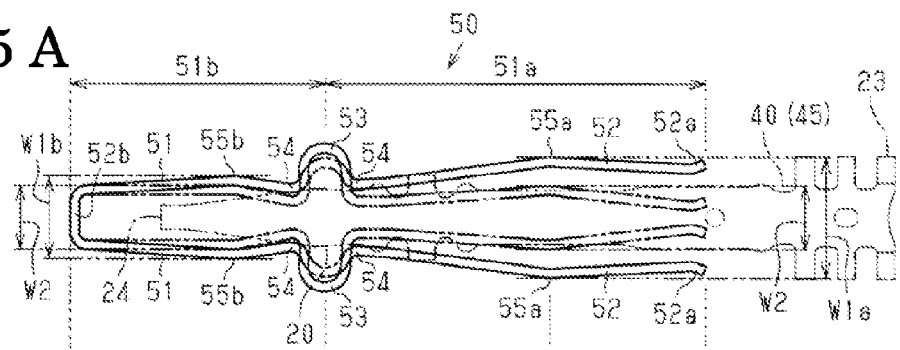
FIG. 5A is a top view of a spring and FIG. 5B is a side view of the spring.
Figure 6:
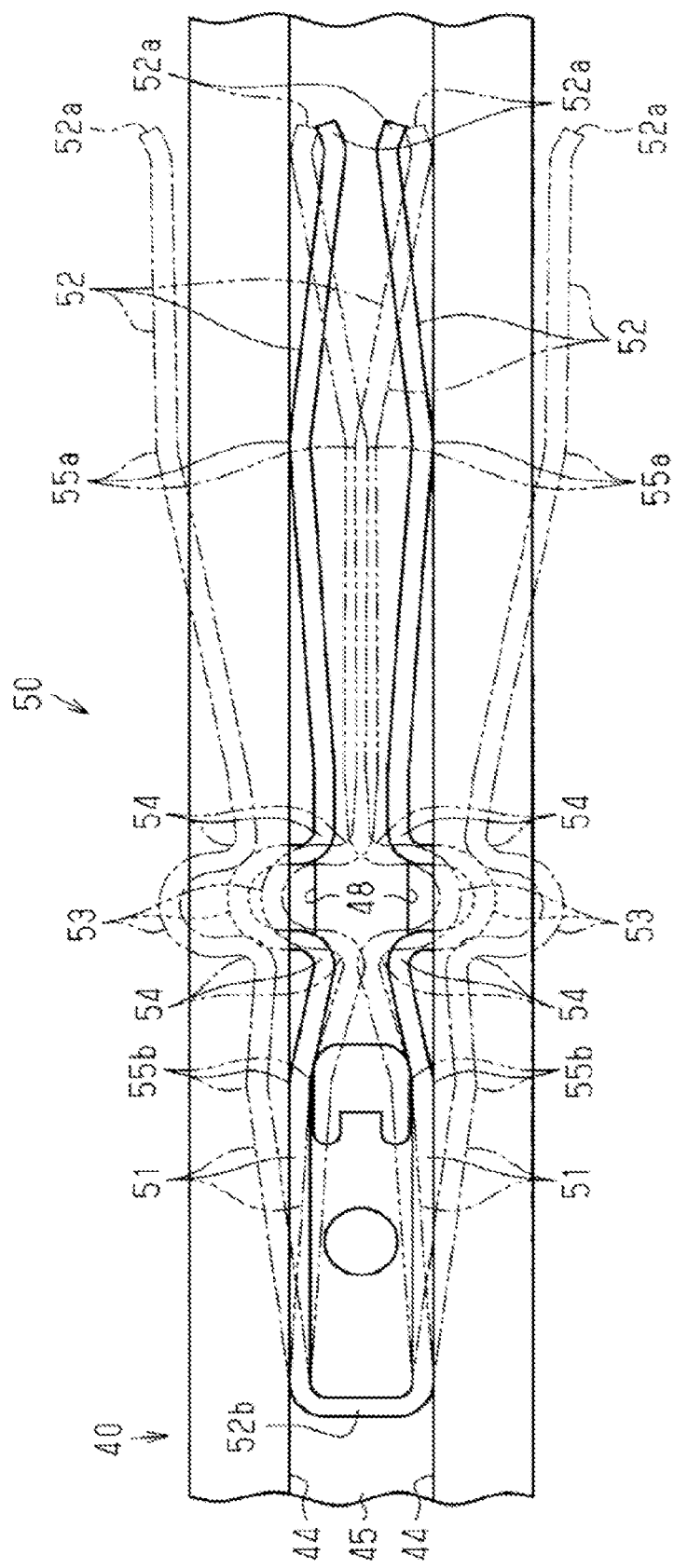
FIG. 6 is a schematic view illustrating a state in which the spring is attached to an upper rail, which also illustrates a state before the attachment is illustrated in the alternate long and short dash lines, a state during the attachment is illustrated in the alternate long and two short dashes lines, and a state after the attachment is illustrated in the full lines.

As illustrated in FIGS. 1 and 6, a spring 50 is arranged inside the upper rail body to follow along an upper side of the lock lever 20. As illustrated in FIG. 5A, the spring 50 includes a spring body 51 formed by a wire material double-folded into two so as to have a shape of a substantial letter L when viewed from above. A locking portion 53 serving as an attachment portion is formed at each of two leg portions 52 of the spring body 51 which are obtained by double-folding the wire material by bending the wire material into two. Each locking portion 53 is bent in a shape of a substantial letter U when viewed from above which forms a continuously bent configuration. The continuously bent configuration presents an arc configuration of which an inclination of a tangent line changes continuously along an outer periphery of the locking portion 53, and the continuously bent configuration presents that positive and negative of a curvature of the arc configuration does not change in middle of the arc configuration.

Figure 5B:
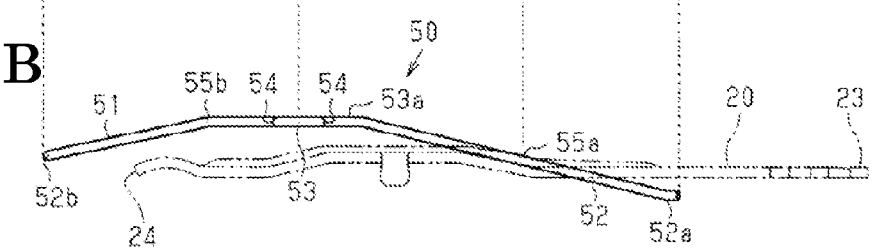

As illustrated in FIG. 5B, each leg portion 52 is folded and bent downwardly at both sides of the corresponding locking portion 53 so as to form a substantially trapezoidal shape in a side view. Each leg portion is formed by a rear body portion 51a and a front body portion 51b, while the corresponding locking portion 53 serving as a joint, that is, a joining portion, of the rear body portion 51a and the front body portion 51b. The rear body portion 51a is extended from the locking portion 53 to a rear side in the front and rear direction L and the front body portion 51b is extended from the locking portion 53 to a front side in the front and rear direction L. Each locking portion 53 and an upper surface 53a are formed to be flat so that the locking portion 53 and the upper surface 53a can be in contact with an inner surface of the upper wall portion 45 when being attached to the upper rail 40. The upper surface 53a is from each locking portion 53 to the portions folded and bent at the both sides of the locking portion 53.

As illustrated in FIG. 6, each locking portion 53 is inserted in the corresponding locking hole 48 of the upper rail 40 and is locked at a peripheral edge of the locking hole 48, and thus the spring 50 is locked. By being locked in this manner, the spring 50, that is, the rear body portion 51a and the front body portion 51b, is attached to the upper rail 40 to be elastically deformable in the upper and lower direction H. Each locking portion 53 protrudes in the width direction W from the corresponding upper edge 45a of the upper rail 40.

As illustrated in FIG. 5A and FIG. 6, a bent portion 54 is formed both ends of each locking portion 53. The bent portion 54 is folded and bent towards the inside of the upper rail body. A contact portion 55a is formed at a portion from the bent portion 54 towards an open end 52a of the leg portion 52, that is, the contact portion 55a is formed at each rear body portion 51a. Each contact portion 55a is folded and bent towards a side opposite to the bent portion 54 so that the contact portion 55a can be in contact with an inner surface of the corresponding side wall portion 44 of the upper rail 40. The contact portions 55a are formed to face each other in the width direction W at the leg portions 52 and to project in the width direction W. Accordingly, a portion from each locking portion 53 to the corresponding contact portion 55a is a continuous portion that is provided continuously in a manner that the continuous portion is out of contact with the side wall portion 44 with which the corresponding contact portion 55a is in contact.

As illustrated specifically in FIG. 5A, according to the spring body 51 of this embodiment, a width W1a between the two contact portions 55a of the leg portions 52 before being attached to the upper rail 40 (each of the leg portions 52 indicated by the full lines in FIG. 5A) is set to be larger than a width W2 between the two contact portions 55a of the leg portions 52 after being attached to the upper rail 40 (each of the leg portions 52 indicated by the alternate long and two short dashes lines in FIG. 5A). The width W2 corresponds to a width of the upper wall portion 45 inside the upper rail body and corresponds to a width between the two side wall portions 44. That is, after being attached to the upper rail 40, the spring body 51 elastically deforms by a difference between the width W1a and the width W2 in a direction in which the contact portions 55a (the leg portions 52) come close to each other, that is, towards an inner side relative to the locking holes 48.

As each contact portion 55a projecting in the width direction W comes into contact with the inner surface of the corresponding side wall portion 44, the positioning of the open end 52a of the corresponding leg portion 52 of the spring 50 relative to the lock lever 20 is conducted.

Specifically, due to the positioning, the open end 52a of each leg portion 52 comes in contact with the rear end portion 23 of the lock lever 20 from above. Then, the rear body portion 51a that includes the open ends 52a serving as a first biasing portion biases the rear end portion 23 of the lock lever 20 to make the rear end portion 23 to move downwardly. Thus, the locking claws 23a to 23c of the lock lever 20 are biased in a direction in which the locked state is maintained.

In addition, a contact portion 55b is formed at a portion from each bent portion 54 towards a connected end 52b at which the leg portions 52 are connected, that is, the contact portion 55b is formed at the front body portions 51b. Each contact portion 55b is folded and bent towards the side opposite to the corresponding bent portion 54 so that the contact portion 55b can be in contact with the inner surface of the corresponding side wall portion 44 of the upper rail 40. The contact portions 55b are formed to face each other in the width direction W at the leg portions 52 and to project in the width direction W. Accordingly, a portion from each locking portion 53 to the corresponding contact portion 55b is the continuous portion that is provided continuously in a manner that the continuous portion is out of contact with the side wall portion 44 with which the contact portion 55b is in contact.

As illustrated specifically in FIG. 5A, according to the spring body 51 of this embodiment, a width W1b between the two contact portions 55b of the leg portions 52 before being attached to the upper rail 40 (each of the leg portions 52 indicated by the full lines in FIG. 5A) is set to be larger than the width W2 between the two contact portions 55b of the leg portions 52 after being attached to the upper rail 40 (each of the leg portions 52 indicated by the alternate long and two short dashes lines in FIG. 5A). That is, after being attached to the upper rail 40, the spring body 51 elastically deforms by a difference between the width W1b and the width W2 in the direction in which the contact portions 55a (the leg portions 52) come close to each other, that is, towards the inner side relative to the locking holes 48.

As each contact portion 55b comes into contact with the inner surface of the corresponding side wall portion 44, the positioning of the connected end 52b of the respective leg portions 52 of the spring 50 is conducted relative to the lock lever 20 or relative to the operation handle 60.

Here, the operation handle 60 will be described. As illustrated in FIG. 1, the lock lever 20 includes a front end portion 24 at an end portion opposite to the locking claws 23a to 23c. The operation handle 60 is formed by performing a bending process to a pipe material and is connected to the front end portion 24 of the lock lever 20. The operation handle 60 has a known configuration including an operation portion 61 and a pair of insertion portions 62. The operation portion 61 is arranged at a front side relative to the seat 12 along the width direction W of the seat 12 and the insertion portions 62 are extended along the upper rails 40 arranged at the right side and the left side. In a state where a distal end 62a of the insertion portion 62 is inserted inside the upper rail body, the operation handle 60 is extended from a front opening portion 40a of the upper rail 40.

The connected end 52b of the leg portions 52 of the spring body 51 which has been positioned as described above extends towards a front side of the vehicle so as to be arranged in the vicinity of the front opening portion 40a of the upper rail 40. That is, the connected end 52b supports the insertion portion 62 (the distal end 62a) of the operation handle 60 from a lower side. As the front body portion 51b, which includes the connected end 52b serving as a second biasing portion, biases the insertion portion 62 of the operation handle 60 to make the insertion portion 62 to move upwardly, the insertion portion 62 of the operation handle 60 is biased in the direction in which the locked state is maintained.

Therefore, at a normal time when an operation input relative to the operation handle 60 is not performed, each of the locking claws 23a to 23c of the lock lever 20 engages with the corresponding lock hole 33a of the lower rail 30 according to an elastic force of the open end 52a of the spring 50. That is, the seat slide device 10 is in the locked state.

By operating the operation handle 60 to pull the operation portion 61 upwardly, the operation handle 60 moves in such a manner that the distal end 62a pushes the front end portion 24 of the lock lever 20 downwardly against the biasing force from the spring 50. Accordingly, the lock lever 20 pivots against an elastic force of the open end 52b of the spring 50, and each of the locking claws 23a to 23c provided at the rear end portion 23 of the lock lever 20 moves upwardly to disengage from the corresponding lock hole 33a of the lower rail 30. Thus, the locked state of the seat slide device 10 is released and the unlocked state is established.

Next, an assembling procedure of the vehicular seat slide device 10 is described with a focus on an assembly process of assembling the spring 50 to the upper rail 40. As illustrated in FIG. 6, each locking portion 53 is inserted into the corresponding locking hole 48 in such a manner that the spring 50 is inserted from a lower side towards an upper side of the upper rail 40. For the insertion, first, the spring body 51, at which the contact portions 55a and the contact portions 55b of the leg portions 52 are open to include the width W1a and the width W1b, respectively (the leg portions 52 indicated with the alternate long and short dash line in FIG. 6), is elastically deformed in the direction in which the leg portions 52 come close to each other. In addition, the spring body 51 is made elastically deformed until an end of each locking portion 53 becomes insertable inside the upper rail body. In association with this, the spring body 51 deforms elastically in a manner that the leg portions 52 intersect with each other (the leg portions 52 indicated with the alternate long and two short dashes lines in FIG. 6).

In a state where the spring body 51 is elastically deformed as described above, the upper surfaces 53a of the spring body 51 are applied onto the inner surface of the upper wall portion 45 of the upper rail 40 in a manner that the upper surfaces 53a are placed aiming at the upper edges 45a of the upper rail 40. Thus, the positioning of each locking portion 53 in the upper and lower direction H relative to the corresponding locking hole 48 is performed. In association with this, the positioning of each locking portion 53 in the front and rear direction L relative to the corresponding locking hole 48 is performed. When a position of each locking portion 53 matches the corresponding locking hole 48, the spring body 51 recovers from the elastic deformation, and accordingly each locking portion 53 enters into the corresponding locking hole 48.

In association with this, the spring body 51 recovers from the elastic deformation, from the state where the leg portions 52 intersect with each other until the contact portions 55a and the contact portions 55b of the leg portions 52 reach the width W2 (the leg portions 52 indicated with the full line in FIG. 6). In this state, each locking portion 53 is locked at the peripheral edge of the corresponding locking hole 48. In addition, because the contact portions 55a and the contact portions 55b of the leg portions 52 have not completely returned to the width W1a and the width W1b in this state, an inserted state of each locking portion 53 into the locking hole 48, that is, a locked state, is maintained by a recovery force of recovering from the elastic deformation, accordingly. In this manner, the positioning of the spring 50 relative to the upper rail 40 is conducted and the spring 50 is fastened to the upper rail 40 in a state where the spring 50 is restricted from coming off the upper rail 40.

In association with this, each of the contact portions 55a, 55b of the spring 50 is in contact with the inner surface of the corresponding side wall portion 44 of the upper rail 40. That is, the open ends 52a of the spring 50 are positioned so as to bias the rear end portion 23 of the lock lever 20 downwardly, and the connected end 52b is positioned so as to bias the distal end 62a of the insertion portion 62 upwardly.

Next, by rotating the lock lever 20 from a lower side in a manner that the front and rear direction L serves as an axis, each of the locking claws 23a to 23c is inserted into the corresponding insertion hole 44a, 44b, 44c and each pivot shaft portion 22 is inserted into the corresponding insertion hole 47. More specifically, first, by tilting the lock lever 20, one of each pair of locking claws 23a to 23c is inserted into the insertion hole 44a to 44c serving as the inserting destination until the root of the locking claw is inserted into the insertion hole, aiming at an upper edge of the insertion hole 44a to 44c. At the same time, one of the pivot shaft portions 22 is inserted into the insertion hole 47 serving as the inserting destination, aiming at an upper edge of the insertion hole 47. Next, the lock lever 20 is rotated while the front and rear direction L serving as the axis so that the other of each pair of locking claws 23a to 23c is allowed to pass through a lower edge of the insertion hole 44a to 44c serving as the inserting destination. At the same time, the other of the pivot shaft portions 22 is made to pass through the lower edge of the insertion hole 47 serving as the inserting destination. In this way, the lock lever 20 is rotatably attached to the upper rail 40.

After the above-described assembly process is performed to each of the upper rails 40 arranged on the left side and the right side, each upper rail 40 is attached to the corresponding lower rail 30 to be movable relative to the lower rail 30. Further, the distal end 62a of the operation handle 60 is attached to be disposed between the inner surface of the upper wall portion 45 and the spring 50 at the upper rail 40. Accordingly, the seat slide device 10 is obtained as described above.

Next, effects and operation of the vehicular seat slide device 10 will be described. The attachment of the spring 50 to the upper rail 40 is performed by placing the spring 50, that is, each locking portion 53, onto the corresponding upper edge 45a of the upper rail 40, aiming at the upper edge 45a, and inserting the locking portion 53 to the corresponding locking hole 48. In addition, when attaching the spring 50 to the upper rail 40, each locking portion 53 is inserted into the corresponding locking hole 48 in a state where the spring body 51 is elastically deformed, and thus each locking portion 53 is locked at the peripheral edge of the corresponding locking hole 48. With the use of the above-described locking manner, when the spring 50 is attached to the upper rail 40, the positioning of the locking portions 53 relative to the respective locking holes 48 is conducted easily. In addition, the positioning of the spring 50 relative to the upper rail 40 and the fastening of the spring 50 to the upper rail 40 are performed together with each other.

However, even though the spring 50 is positioned relative to the upper rail 40, this positioning is not meaningful if the positioning of the spring 50 relative to the lock lever 20 and/or to the operation handle 60 is inappropriate.

In this embodiment, the portion from each locking portion 53 of the spring 50 to the corresponding contact portion 55a and the portion from each locking portion 53 of the spring 50 to the corresponding contact portion 55b are out of contact with the corresponding side wall portions 44 with which the contact portions 55a and the contact portions 55b are in contact. Thus, in particular, it can be prevented that the spring 50 and the peripheral edges of the locking holes 48 are in contact with each other inside the upper rail body. Accordingly, each of the contact portions 55a and 55b can be in contact with the inner surface of the corresponding side wall portion 44 more reliably. In consequence, the spring 50 can be positioned relative to the lock lever 20 and/or relative to the operation handle 60 more reliably.

In addition, the contact portions 55a and 55b of the spring 50 are attached to the upper rail 40 by being deformed in the direction in which the corresponding contact portions come closer to each other. In addition, the contact portions 55a and 55b are in contact with the corresponding side wall portions 44 (side walls) of the upper rail 40 due to the recovery force for recovering from the elastic deformation, and the contacted state is maintained. Thus, each of the contact portions 55a and 55b can be in contact with the side wall portion 44 of the upper rail 40 more reliably.

As described above, the spring 50 and the peripheral edges of the locking holes 48 are prevented from being in contact with each other inside the upper rail body. Therefore, even in a case where an attachment error in association with the attachment of the spring 50 to the upper rail 40 occurs between each locking portion 53 and the corresponding contact portion 55a or 55b, a posture of the spring 50 in a state of being attached to the upper rail 40 is adjusted autonomously by itself.

As long as each contact portion 55a of the spring 50 comes in contact with the inner surface of the corresponding side wall portion 44, a state in which the positioning has been conducted can be reproduced at the portion from each contact portion 55a to the corresponding open end 52a, the positioning which includes a dimension thereof and an arrangement of the open end 52a, for example. Consequently, the positioning of each open end 52a relative to the lock lever 20 is easily reproduced on the basis of a setting assuming a state in which the spring 50 is attached to the upper rail 40. The same applies to the connected end 52b that is in contact with the inner surfaces of the side wall portions 44 with which the respective contact portions 55b of the spring 50 are in contact. The positioning of the connected end 52b relative to the lock lever 20 and/or relative to the operation handle 60 is easily reproduced on the basis the setting assuming the state in which the spring 50 is attached to the upper rail 40.

In this embodiment, the spring 50 functions as a so-called torsion spring (torsion spring) biasing the rear body portions 51a including the respective open ends 52a and the front body portions 51b including the connected end 52b in different directions from each other in the upper and lower direction H. In a case where the actions that differ from each other are brought at the rear body portion 51a and at the front body portions 51b as described above, a stress related thereto may concentrate at the joining portion. In this regard, in this embodiment, each of the locking portions 53 is bent to have the shape of the substantial letter U as viewed from above, which defines the continuously bent configuration, and therefore the stress does not concentrate on a limited portion of each of the locking portions 53 serving as the joining portion of the rear body portion 51a and the front body portion 51b. Accordingly, in this embodiment, an even distribution of the stress is achieved.

According to this embodiment described above, the following effects can be obtained. (1) The spring 50, that is, each of the locking portions 53, is placed at the corresponding upper edge 45a of the upper rail 40 in a manner that the upper edge 45a is aimed at when each locking portion 53 is placed, and the spring body 51 is made elastically deformed and each of the locking portions 53 is inserted into the locking hole 48. Thus, the positioning of the locking portions 53 relative to the respective locking holes 48 can be easily conducted when the spring 50 is attached to the upper rail 40. Further, the positioning of the spring 50 relative to the upper rail 40 and the fastening of the spring 50 to the upper rail 40 can be performed in conjunction therewith. Thus, the assembly process of assembling the spring 50 to the upper rail 40 and a configuration for the assembly can be simplified. That is, an assembling performance of the spring 50 when the spring 50 is being attached to the upper rail 40 can be enhanced.

(2) Each of the locking portions 53 is bent and folded to form the shape of the substantial letter U when viewed from top, the shape which includes the continuously bent configuration, and consequently the stress concentrated on each locking portion 53 can be distributed uniformly. Accordingly, the configuration for attaching the spring 50 to the upper rail 40 is simplified, and also it is restricted that the engagement of the lock lever 20 and the lower rail 30 with each other is not maintained.

(3) Specifically, in this embodiment, each of the locking portions 53 is formed to include the arc configuration and not to include a linear portion in middle of the arc configuration, and thus the even distribution of the stress is achieved appropriately. (4) In addition, as is the case with the spring 50 of this embodiment, even in a case where the spring functions as the so-called torsion spring, the uniform distribution of the stress is achieved appropriately.

(5) The bent portion 54 is provided at the spring 50, and thus the positioning of the spring 50 relative to other component member, including the lock lever 20, the operation handle 60, and so forth, is conducted even more reliably in a state where the spring 50 is attached to the upper rail 40.

(6) With regard to each of the open ends 52a and the connected end 52b, the positioning of each open end 52a relative to the lock lever 20 and the positioning of the connected end 52b relative to the lock lever 20 are easily reproduced on the basis of the setting that assumes the state in which the spring 50 is attached to the upper rail 40. As a result, a variation in the positioning of the spring relative to the lock lever can be restricted.

(7) Because the posture of the spring 50 in a state of being attached is adjusted automatically by itself, the positioning of the spring 50 relative to the lock lever 20 and/or relative to the operation handle 60 is restricted from varying.

(8) With regard to each of the contact portions 55a of the spring 50 and each of the contact portions 55b of the spring 50, the contact of the contact portions 55a and 55b with the inner surfaces of the respective side wall portions 44 of the upper rail 40 is appropriately maintained by the recovery force for recovering from the elastic deformation. Accordingly, the contact of each of the contact portions 55a and 55b with the inside the upper rail body, that is, the contact with the inner surface of the corresponding side wall portion 44, can be made more reliably.

Second Embodiment

Figure 7:
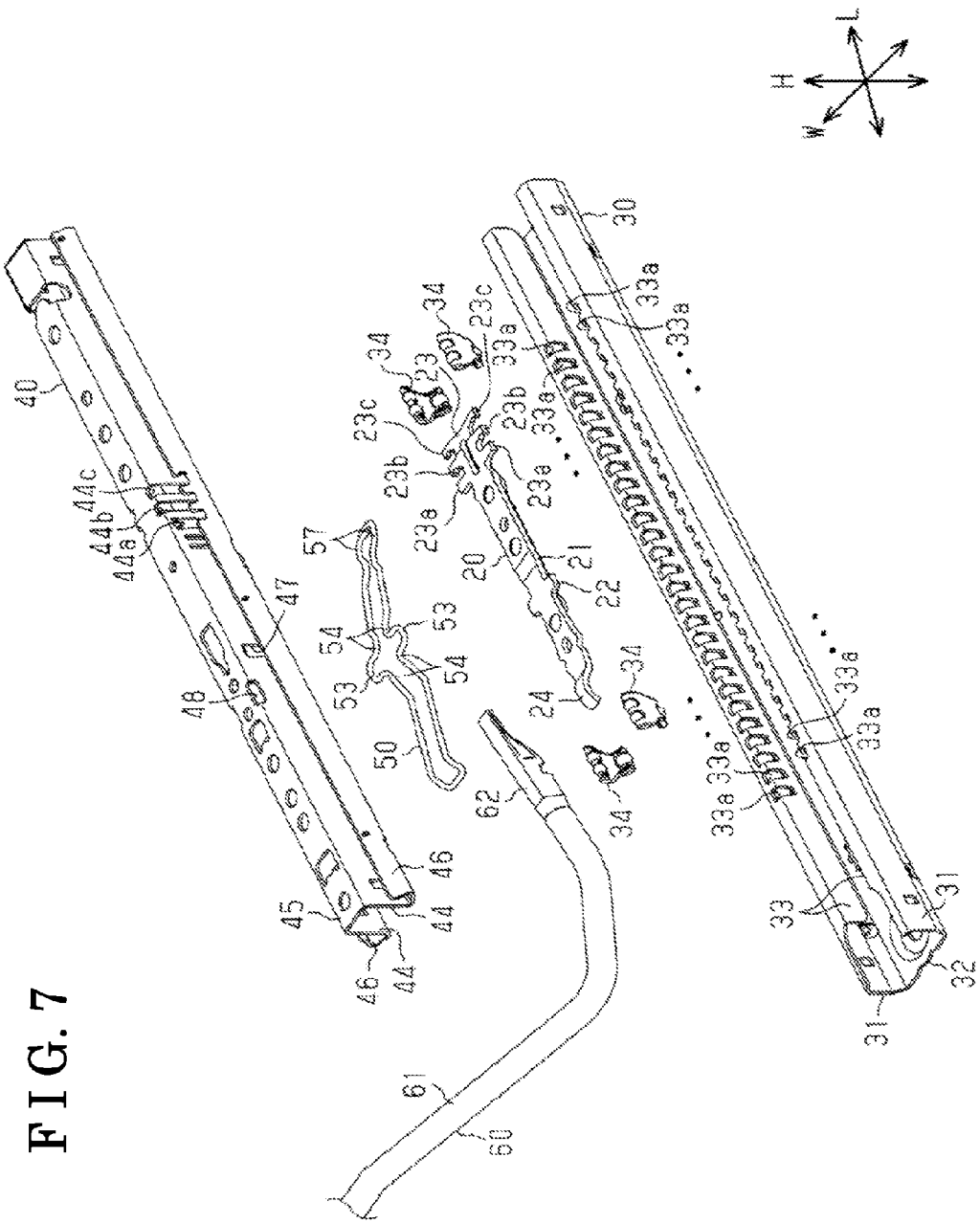
FIG. 7 is a perspective view illustrating a configuration of a seat slide device of a second embodiment.

A second embodiment will be described with reference to FIGS. 7 to 9B. As illustrated in FIG. 7, a vehicular seat slide device 1 of this embodiment is provided with the component parts that are same as the component parts of the first embodiment. Therefore, the explanation on the component parts that are similar to the first embodiment will be omitted. In comparison with the first embodiment, in particular, a configuration of the spring is different in the second embodiment.

Figure 8:
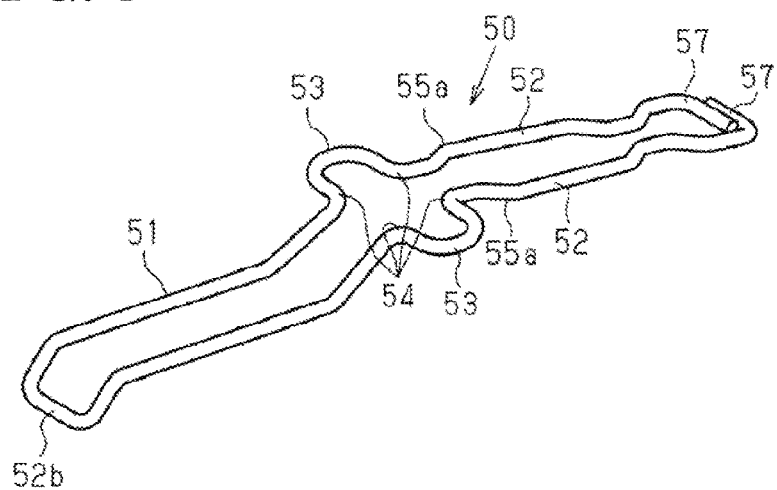
FIG. 8 is a perspective view of a spring of FIG. 7.
Figure 9A:
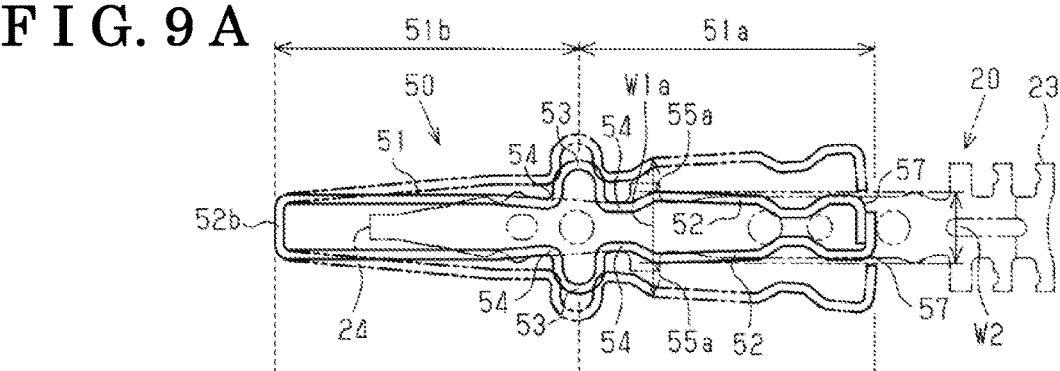
FIG. 9A is a top view of the spring of FIG. 8
Figure 9B:
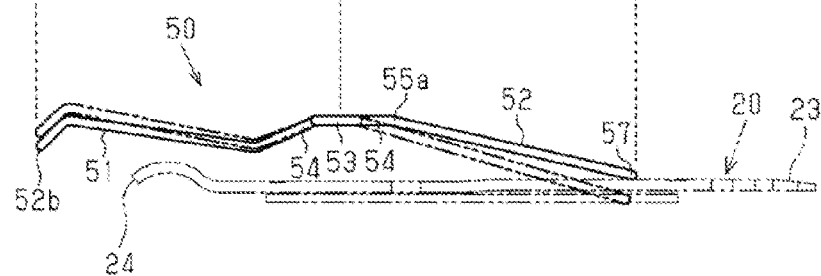
FIG. 9B is a side view of the spring.

As illustrated in FIGS. 8, 9A and 9B, in the second embodiment, the spring 50 includes a pair of open ends 57 positioned at an end of the spring 50. Each of the open ends 57 is bent and folded towards the inner side in the width direction, thereby to extend in a direction that is substantially orthogonal to a long-side direction of the spring 50. Both of the open ends 57 are positioned to be adjacent to each other in the long-side direction of the spring 50.

In FIGS. 9A and 9B, the spring 50 indicated with the full lines is in an assembled state to the upper rail 40, and the spring 50 indicated with the alternate long and two short dashes lines is in a state before being assembled to the upper rail 40. At the spring body 51, the width W1a between the two contact portions 55a of the leg portions 52 before being attached to the upper rail 40 is set to be larger than the width W2 after being attached to the upper rail 40.

A length of the open end 57 in the width direction W is set in such a manner that a length of the two open ends 57 added to each other is larger than a width between the side wall portions 44. Thus, in a state where the spring 50 is assembled to the upper rail 40, the two open ends 57 are extended over the substantially entire width between the side wall portions 44.

In this embodiment, with the use of the spring 50 including the above-explained configuration, the following effects are obtained in addition to the effects of the first embodiment. (9) The pair of open ends 57 of the spring 50 is extended inwardly in the width direction W. According to this configuration, both open ends 57 can be in line contact with a locking member 20. Accordingly, an area at which the spring 50 is in contact with the locking member 20 increases. Consequently, the locking member 20 can be held by the spring 50 stably.

(10) The two open ends 57 of the spring 50 are extended over the substantially entire width between the side wall portions 44. Thus, the biasing force of the open ends 57 of the spring 50 acts to the locking member 20 evenly without being deviating in the width direction. As a result, the locking member 20 can be held by the spring 50 stably.

Each of the aforementioned embodiments can be implemented in the following manners with appropriate changes and/or modifications added. The bent portion 54 may not necessarily be formed. However, also in this case, a portion including some R or a curvature radius (curvature), that is, a so-called minimum curvature radius, is formed by bending the wire material, and the portion can function as the bent portion.

With regard to the positioning of the spring 50 relative to the lock lever 20 and/or relative to the operation handle 60, the example is shown in which each of the contact portions 55a and/or 55b is brought into contact with the inner surface of each of the side wall portions 44 of the upper rail 40, however, other method can be used. For example, a method in which each of the contact portions 55a and/or 55b is brought into contact with the inner surface of the upper wall portion 45 of the upper rail 40 can be applied.

Each of the locking portions 53 serves as the joining portion joining the rear body portion 51a and the front body portion 51b to each other, however, the joining portion may be formed separately from each of the locking portions 53.

Each of the aforementioned embodiments can be applied to the vehicular seat slide device including specifications in which the function of biasing the rear end portion 23 of the lock lever 20 downwardly and the function of basing the operation handle 60 upwardly are given to separate springs, respectively. In this case, at least either of the springs may be attached to the upper rail 40 in the method described in the embodiments.

Each of the locking holes 48 opens to the corresponding side wall portion 44 and to the upper wall portion 45 in a manner the locking hole 48 straddle the corresponding side wall portion 44 and to the upper wall portion 45. Alternatively, each of the locking holes 48 may open only to the corresponding side wall portion 44. The locking hole 48 may be formed at least either of the two side wall portions 44 of the upper rail 40.

Each of the locking portions 53 may include the continuously bent configuration, for example, each locking portion 53 may include an asymmetric configuration to each other at a side of the rear body portion 51a and at a side of the front body portion 51b. Each of the aforementioned embodiments can be applied to the vehicular seat slide including specifications in which a spring provides a force which biases the rear body portion 51a and the front body portion 51b in the same direction.

Each of the aforementioned embodiments can be applied to the vehicular seat slide including specifications in which each of the lock holes 33a is formed at the lower rail 30 to open towards the lower side, and each of the locking claws 23a to 23c is moved upwardly by the pivoting movement of the lock lever 20 and engages with the corresponding lock hole 33a of the lower rail 30. Accordingly, the locked state in which the relative movement of the upper rail 40 is restricted is established. In this case, when each of the locking claws 23a to 23c is moved downwardly by the pivoting movement of the lock lever 20, the locking claws 23a to 23c disengages from the corresponding lock hole 33a of the lower rail 30, and accordingly the unlocked state in which the relative movement of the upper rail 40 is allowed is established.

In the first embodiment, with regard to the positioning of the spring 50 relative to the lock lever 20 and/or relative to the operation handle 60, the example in which each of the contact portions 55a and each of the contact portions 55b is brought into contact with the inner surface of the corresponding side wall portion 44 of the upper rail 40 is explained. In the second embodiment, the example in which each of the contact portions 55a is brought into contact with the corresponding side wall portion 44 of the upper rail 40. However, other method may be applied. For example, a method may be applied in which each of the contact portions 55a or each of the contact portions 55b, or both of the contact portions 55a and the contact portions 55b is brought into contact with the inner surface of the upper wall portion 45 of the upper rail 40.

In each of the embodiments, with regard to the attachment of the spring 50 to the upper rail 40, the example in which each of the locking portions 53 is locked at the corresponding locking hole 48 is explained. Alternatively, the spring 50 can be fastened to the upper rail 40 with the use of a locking part including a pin, for example, so that the spring 50 is restricted from coming off the upper rail 40. Alternatively, the locking hole can be formed at the upper wall portion 45 of the upper rail 40 and the locking portion of the spring 50 is hooked at the locking hole, for example. Such examples, in which the locking portion is hooked, include a case where the locking portion is formed to have a shape of a substantial letter U as viewed from a side and is locked at the locking hole, and a case where the locking portion is formed to project from the locking hole and is locked at the locking hole in the projected manner.

EXPLANATION OF REFERENCE NUMERALS

10 ... vehicular seat slide device, 12 ... seat, 20 ... lock lever, 22a to 22c ... locking claw, 23 ... rear end portion, 30 ... lower rail, 33a ... lock hole, 40 ... upper rail, 44a to 44c ... insertion hole, 44 ... side wall portion, 45 ... upper wall portion, 45a ... upper edge, 48 ... locking hole, 50 ... spring, 51 ... spring body, 51a ... rear body portion, 51b ... front body portion, 52 ... leg portion, 52a ... open end, 52b ... connected end, 53 ... locking portion, 54 ... bent portion, 55a, 55b ... contact portion, 60 ... operation handle

The invention claimed is:

1. A vehicular seat slide device comprising:
a lower rail;
an upper rail provided to be movable relative to the lower rail along a long-side direction of the lower rail and configured to support a seat above;
a lock lever supported by the upper rail, and configured to restrict the relative movement of the upper rail by engaging with the lower rail; and
a spring attached to the upper rail, and biasing in such a manner that the lock lever engages with the lower rail;
the spring including:
a spring body; and
a locking portion inserted in a locking hole provided at an upper edge of the upper rail and opening to a side surface of the upper rail, the locking portion being insertable into the locking hole by elastically deforming the spring body towards an inner side relative to the locking hole, the locking portion restricted from being detached from the locking hole in an insertion direction by being locked at a peripheral edge of the locking hole due to recovery of the elastic deformation, wherein the spring includes an arc configuration from a connected portion to an open end.

2. The vehicular seat slide device according to claim 1, further comprising:
an operation handle operated to release the engagement of the lock lever and the lower rail with each other, wherein
the spring includes a first biasing portion biasing the lock lever in such a manner that the engagement of the lock lever and the lower rail with each other is maintained,
the spring includes a second biasing portion biasing the operation handle in such a manner that the engagement of the lock lever and the lower rail with each other is maintained, and
the first biasing portion and the second biasing portion are connected to each other via the locking portion including a continuously bent configuration.

3. The vehicular seat slide device according to claim 2, wherein a direction in which the first biasing portion biases the lock lever and a direction in which the second biasing portion biases the operation handle are opposite to each other.

4. The vehicular seat slide device according to claim 1, wherein
the spring includes a bent portion provided at a position corresponding to the peripheral edge of the locking hole, the bent portion being bent towards the insertion direction to the locking hole.

5. The vehicular seat slide device according to claim 1, wherein the locking portion includes an arc configuration.

6. A vehicular seat slide device comprising:
a lower rail;
an upper rail provided to be movable relative to the lower rail along a long-side direction of the lower rail and configured to support a seat above;
a lock lever supported by the upper rail, and configured to restrict the relative movement of the upper rail by engaging with the lower rail; and
a spring attached to the upper rail and biasing in such a manner that the lock lever engages with the lower rail;
the spring including:
an attachment portion attached to the upper rail;
a biasing portion arranged at a predetermined position of the lock lever and biasing in such a manner that the lock lever engages with the lower rail; and
contact portion being between the attachment portion and the biasing portion, and being in contact with an inner surface of the upper rail, wherein
the spring includes two leg portions formed by a wire material that is double-folded and the spring is attached to the upper rail in such a manner that a width direction of each of the leg portions matches a width direction of the upper rail,
the contact portions face in the width direction of each of the leg portions, and the contact portions are provided to project in the width direction and are in contact with both side walls of the upper rail, and
a width of the contact portions facing in the width direction of each of the leg portions before being attached to the upper rail is set to be larger than an opening width of the upper rail, wherein the spring includes an arc configuration from a connected portion to an open end.

7. A vehicular seat slide device comprising:
a lower rail;
an upper rail provided to be movable relative to the lower rail along a long-side direction of the lower rail and configured to support a seat above;
a lock lever supported by the upper rail, and configured to restrict the relative movement of the upper rail by engaging with the lower rail; and
a spring attached to the upper rail and biasing in such a manner that the lock lever engages with the lower rail;
the spring including:
an attachment portion attached to the upper rail;
a biasing portion arranged at a predetermined position of the lock lever and biasing in such a manner that the lock lever engages with the lower rail; and
a contact portion being between the attachment portion and the biasing portion, and being in contact with an inner surface of the upper rail, wherein
the spring includes a spring body, and
the attachment portion is inserted in a locking hole provided at an upper edge of the upper rail and opening to a side surface of the upper rail, the attachment portion is insertable into the locking hole by elastically deforming the spring body towards an inner side relative to the locking hole, the attachment portion is locked at a peripheral edge of the locking hole due to recovery of the elastic deformation, wherein the spring includes an arc configuration from a connected portion to an open end so that the attachment portion is restricted from being detached from the locking hole.

* * * * *